United States Patent
Nakata et al.

(10) Patent No.: US 7,345,103 B2
(45) Date of Patent: Mar. 18, 2008

(54) HYDRAULIC COMPOSITION

(75) Inventors: Yoshitomo Nakata, Nishinomiya (JP); Norihiro Wakao, Kawasaki (JP); Takashi Tomita, Toyonaka (JP)

(73) Assignee: Nippon Shokubai Co., Ltd., Osaka-shi, Osaka (JP)

( * ) Notice: Subject to any disclaimer, the term of this patent is extended or adjusted under 35 U.S.C. 154(b) by 445 days.

(21) Appl. No.: 10/931,233

(22) Filed: Sep. 1, 2004

(65) Prior Publication Data

US 2005/0045070 A1     Mar. 3, 2005

(30) Foreign Application Priority Data

Sep. 2, 2003   (JP) ............................. 2003-310620

(51) Int. Cl.
C04B 24/26     (2006.01)

(52) U.S. Cl. ............................. 524/5; 524/4

(58) Field of Classification Search ................ 524/4–5
See application file for complete search history.

(56) References Cited

U.S. PATENT DOCUMENTS

| | | | | |
|---|---|---|---|---|
| 3,140,269 | A * | 7/1964 | Wahl et al. ................. | 523/130 |
| 4,602,685 | A   | 7/1986 | McKenzie et al. | |
| 4,674,574 | A * | 6/1987 | Savoly et al. ............... | 166/293 |
| 6,296,698 | B1* | 10/2001| Naramoto et al. .......... | 106/808 |
| 6,995,105 | B1* | 2/2006 | Wache et al. ............... | 501/128 |

FOREIGN PATENT DOCUMENTS

| | | |
|---|---|---|
| JP | 06-263506 A | 9/1994 |
| JP | 2001-048619 A | 2/2001 |

OTHER PUBLICATIONS

Hirata et al, Polycarboxylic Acid Based Cement Dispersant "Aqualoc®", New Horizons in Resource Handling and Geo-Engineering, MMIJ/AusIMM Joint Symposium 1994, UBE Oct. 1-5, 1994, pp. 89-97.

* cited by examiner

Primary Examiner—Peter Szekely
(74) Attorney, Agent, or Firm—Connolly Bove Lodge and Hutz

(57) ABSTRACT

It is an object of the present invention to provide a hydraulic composition which enables both of high fluidity and material separation reducing and can eliminate the delay of setting. The present invention is directed to a hydraulic composition comprising cement (A), a copolymer (B), a high-performance water reducing agent (C) and a powdery cement admixture (D), wherein the copolymer (B) comprises a repeating unit (I) represented by the following formula (1);

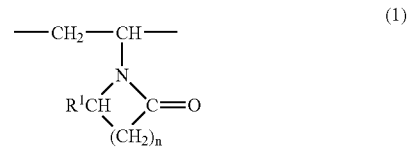

(wherein $R^1$ represents a hydrogen atom or a methyl group. n is an integer of 2 to 4.), and a repeating unit (II) represented by the following general formula (2);

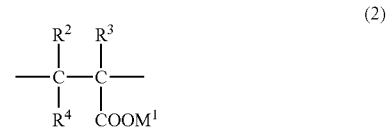

(wherein $R^2$, $R^3$ and $R^4$ are same or different and each represents a hydrogen atom, a methyl group or a $(CH_2)_p$ $COOM^2$ group, and may form a structure of an anhydride when the total number of $COOM^1$ groups and $COOM^2$ groups are 2. $M^1$ and $M^2$ are same or different and each represents a hydrogen atom, a monovalent metal, a divalent metal, an ammonium group or an organic ammonium group, and p is an integer of 0 to 2).

6 Claims, No Drawings

HYDRAULIC COMPOSITION

TECHNICAL FIELD

The present invention relates to a hydraulic composition. More particularly it relates to a hydraulic composition suitable for a cement composition and the like having high fluidity and not causing the segregation of materials.

BACKGROUND ART

A hydraulic composition is essential as materials for constructing civil works and architecture and, for example, cement compositions such as cement paste, mortar and concrete are widely used. In such the field of civil works and architecture, a cement composition and the like having high fluidity and not causing the segregation of materials is required in order to enhance the working efficiency. For this purpose, a water reducing agent having an effect of improving the strength and the durability of curing product by enhancing the fluidity of cement composition and reducing its water content, and a material segregation reducing agent providing resistance to material segregation by an effect of enhancing the viscosity of the cement composition are added. For example, naphthalene based or polycarboxylic acid based water reducing agents, or polymers such as cellulose and glucan as a material segregation reducing agent (thickener) are added.

Japanese Kokai Publication 2001-48619 (p. 2-3) discloses that with respect to a material segregation reducing agent for cement compositions, when pyrrolidone-sodium acrylate copolymer is used as a material segregation reducing agent, a cement composition having high fluidity and not causing the segregation of materials is attained and a material segregation reducing agent is used in a very small amount. However, in such cement composition to which a material segregation reducing agent is added, there was room for contrivance to enhance its setting rate and to further enhance the working efficiency in the construction field of civil works and architecture and the like.

Japanese Kokai Publications Hei-6-263506 (p. 1-2, 3-4) discloses a hydraulic composition containing a binder including coarse cement, β-1,3-glucan, and a high-performance water reducing agent. However, in this hydraulic composition, an amount of addition of β-1,3-glucan based on the cement is large and characteristics such as high fluidity and material separation reducing cannot be efficiently attained. Therefore there was room for contrivance to improve this point and to make the composition excellent in the working efficiency in the construction field of civil works and architecture and the like.

SUMMARY OF THE INVENTION

The present invention has been made in view of the above-mentioned state of the art, and it is an object of the present invention to provide a hydraulic composition which enables both of high fluidity and material separation reducing and can eliminate the delay of setting.

The present inventors have found that when polyvinylpyrrolidone (PVP) based polymer was used in use of a hydraulic composition such as a cement composition, a characteristic of having high fluidity and not causing the segregation of materials was attained and when the structure of this polymer was specified, this polymer could be effectively used as a material segregation reducing agent and it exhibited a sufficient effect even in small amount of addition. And, the present inventors have led to an idea that if a powdery cement admixture was used in case of providing higher fluidity using a high-performance water reducing agent in such a hydraulic composition, the high-performance water reducing agent was adsorbed to cement particles and suppressed the setting inhibition and the above issues could be resolved clearly.

On the other hand, the present inventors also have found that when a hydraulic composition contains cement, polyvinylpyrrolidone (PVP) based copolymer and a high-performance water reducing agent as an essential component, if needle penetration resistance, which relates to a setting rate of a hydraulic composition, is established in a high range, the hydraulic composition can become one which is high in the working efficiency and useful in the field of civil works and architecture and the like as a hydraulic composition which enables both of high fluidity and material separation reducing and can eliminate the delay of setting, and have led to the present invention.

Thus, the present invention provides a hydraulic composition comprising cement (A), a copolymer (B), a high-performance water reducing agent (C) and a powdery cement admixture (D), wherein the copolymer (B) comprises a repeating unit (I) represented by the following formula (1);

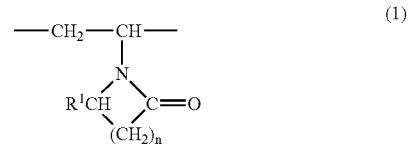

(wherein $R^1$ represents a hydrogen atom or a methyl group. n is an integer of 2 to 4.), and a repeating unit (II) represented by the following general formula (2);

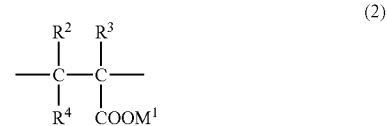

(wherein $R^2$, $R^3$ and $R^4$ are same or different and each represents a hydrogen atom, a methyl group or a $(CH_2)_p COOM^2$ group, and may form a structure of an anhydride when the total number of $COOM^1$ groups and $COOM^2$ groups are 2. $M^1$ and $M^2$ are same or different and each represents a hydrogen atom, a monovalent metal, a divalent metal, an ammonium group or an organic ammonium group, and p is an integer of 0 to 2).

The present invention also provides a method of producing the hydraulic composition according to claim 1, wherein said copolymer (B) and said high-performance water reducing agent (C) are previously mixed and the resulting mixture is added.

DETAILED DESCRIPTION OF THE INVENTION

The present invention is now described in detail.
The hydraulic composition of the present invention comprises cement (A), a copolymer (B), a high-performance water reducing agent (C) and a powdery cement admixture (D), and the copolymer (B) mainly exerts an action as a material segregation reducing agent (thickener) to suppress the segregation of cement or aggregate and the like which inhibits the workability. In the present invention, high fluidity and material separation reducing resulting from the copolymer (B) and the high-performance water reducing agent (C) are efficiently exerted, and these effects are exhibited sufficiently in the field of civil works and architecture and the like even when an amount of the copolymer (B) and the high-performance water reducing agent (C) is low and by containing the powdery cement admixture (D), delay of setting can be eliminated, and combination of these effect make the hydraulic composition excellent in working efficiency.

The above-mentioned copolymer (B) has a repeating unit (I) represented by the above-mentioned formula (1) and a repeating unit (II) represented by the above-mentioned formula (2) as essential constituent units. In is preferred that the above-mentioned two repeating units (I) and (II) are main components of repeating units constituting the copolymer. Such a copolymer may be in any form of block addition, random addition and alternating addition.

Preferably, the above-mentioned copolymer (B) further has a repeating unit (III) repressented by the following formula (3);

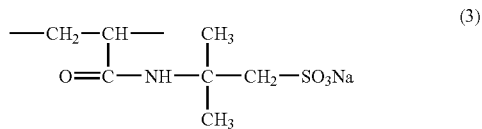

(3)

Further, it is possible to further introduce another repeating units (IV) into the above copolymer (B), if necessary.

The above-mentioned repeating units (I) to (IV) constituting the copolymer (B) of the present invention preferably have a mole ratio ((I):(II):(III):(IV)) of 1 to 99:99 to 1:0 to 50:0 to 50. A mole ratio of 10 to 95:90 to 5:0 to 30:0 to 30 is more preferred and a mole ratio of 20 to 80:80 to 20:0 to 20:0 to 20 is furthermore preferred.

A weight average molecular weight of the above-mentioned copolymer (B) is preferably 600,000 to 10,000,000. More preferably, it is 700,000 to 5,000,000. When the mole ratios of the repeating units (I) to (IV) and the weight average molecular weight of the copolymer (B) are out of the above-mentioned range, the copolymer (B) may not sufficiently exert primarily an action as a material segregation reducing agent.

The above-mentioned copolymer (B) may be produced by polymerizing a monomer forming the repeating unit (I) and a monomer forming the repeating unit (II), and a monomer forming the above-mentioned another repeating units if necessary. The monomers forming these repeating units may be used singly or in combination of two or more species.

As the monomer forming the above-mentioned repeating unit (I), N-vinyl-2-pyrrolidone, N-vinyl-5-methyl-2-pyrrolidone, N-vinyl-2-piperidone, N-vinyl-6-methyl-2-piperidone, N-vinyl-ϵ-caprolactam and N-vinyl-7-methyl-ϵ-caprolactam are suitable. Among others, N-vinyl-2-pyrrolidone and N-vinyl-5-methyl-2-pyrrolidone are preferred.

As the monomer forming the above-mentioned repeating unit (II), unsaturated carboxylic acid monomers are preferred, and unsaturated monocarboxylic acid monomers such as acrylic acid, methacrylic acid, crotonic acid, and monovalent metal salt, divalent metal salt, ammonium salt and organic ammonium salt thereof; and unsaturated dicarboxylic acid monomers such as maleic acid, itaconic acid, citraconic acid and fumaric acid, or acid anhydride, monovalent metal salt, divalent metal salt, ammonium salt and organic ammonium salt thereof are suitable. Among others, acrylic acid, methacrylic acid, maleic acid, and maleic anhydride are preferred.

As the monomer forming the above-mentioned repeating unit (III), there is given 2-acrylamido-2-methyl propane sodium sulfonate (AMPS).

As the monomer forming the above-mentioned repeating unit (IV), there are given the following compounds and the like as a suitable one:

Half-esters and diesters of unsaturated dicarboxylic acids such as maleic acid, fumaric acid, itaconic acid and citraconic acid, and alcohols having 1 to 22 carbon atom(s); half-amides and diamides of unsaturated dicarboxylic acids such as maleic acid, fumaric acid, itaconic acid and citraconic acid, and amines having 1 to 22 carbon atom(s); half-esters and diesters of alkylpolyalkylene glycol formed by adding 1 to 300 moles of oxyalkylene having 2 to 4 carbon atoms to alcohol having 1 to 22 carbon atom(s), and unsaturated dicarboxylic acids such as maleic acid, fumaric acid, itaconic acid and citraconic acid; esterification products of alkoxypolyalkylene glycol such as methoxypolyethylene glycol, ethoxypolyethylene glycol, propoxypolyethylene glycol, methoxypolyethylene glycol-polypropylene glycol, ethoxypolyethylene glycol-polypropylene glycol and propoxypolyethylene glycol-polypropylene glycol and (meth)acrylic acid.

Esters of (meth)acrylic acid such as methyl (meth)acrylate, ethyl (meth)acrylate, propyl (meth)acrylate, butyl (meth)acrylate, 2-ethylhexyl (meth)acrylate, 2-hydroxyethyl (meth)acrylate, hydroxypropyl (meth)acrylate, hydroxybutyl (meth)acrylate and glycidyl (meth)acrylate and alcohols having 1 to 22 carbon atom(s); (poly)alkylene glycol di(meth)acrylates such as triethylene glycol di(meth)acrylate, (poly)ethylene glycol di(meth)acrylate, polypropylene glycol di(meth)acrylate and (poly)ethylene glycol-(poly) propylene glycol di(meth)acrylate; bifunctional (meth)acrylates such as hexanediol di(meth)acrylate, trimethylolpropane tri(meth)acrylate and trimethylolpropane di(meth) acrylate; (poly)alkylene glycol dimaleates such as triethylene glycol dimaleate and polyethylene glycol dimaleate.

Unsaturated sulfonic acids such as vinylsulfonate, (meth) allylsulfonate, 2-(meth)acryloxyethylsulfonate, 3-(meth) acryloxypropylsulfonate, 3-(meth)acryloxy-2-hydroxypropylsulfonate, 3-(meth)acryloxy-2-hydroxypropyl sulfophenyl ether, 3-(meth)acryloxy-2-hydroxypropyloxy sulfobenzoate, 4-(meth)acryloxybutylsulfonate, (meth)acrylamidomethylsulfonic acid, (meth)acrylamidoethylsulfonic acid, 2-methylpropanesulfonic acid (meth)acrylamide and styrenesulfonic acid as well as monovalent metal, divalent metal, ammonium and organic amine salts of these; unsaturated monocarboxylic acids such as acrylic acid, methacrylic acid and crotonic acid as well as metal, ammonium and amine salts thereof; alkanediol mono(meth)acrylates such as 1,4-butanediol mono(meth)acrylate, 1,5-pentanediol mono(meth)acrylate and 1,6-hexanediol mono (meth) acrylate; amides of unsaturated mono carboxylic acid and amines having 1 to 22 carbon atoms such as methyl(meth) acrylamide; unsaturated amides such as (meth)acrylamide, (meth)acrylalkylamides, N-methylol (meth)acrylamide and N,N-dimethyl(meth)acrylamide; unsaturated amines such as aminoethyl (meth)acrylate, methylaminoethyl (meth)acrylate, diemthylaminoethyl (meth)acrylate, dimethylaminopropyl (meth)acrylate, dibutylaminoethyl (meth)acrylate and vinyl pyridine; cyanurates such as triallyl cyanurate; allyl compounds such as (meth)allyl alcohol and glycidyl (meth)allyl ether; unsaturated amino compounds such as dimethylaminoethyl (meth)acrylate; Siloxane derivatives such as polydimethylsiloxane-propylaminomaleamic acid, polydimethylsiloxane-aminopropyleneaminomaleamic acid, polydimethylsiloxane-bis-(propylaminomaleamic acid), polydimethylsiloxane-bis-(dipropyleneaminomaleamic acid), polydiemthylsiloxane-(1-propyl-3-acrylate), polydimethylsiloxane-(1-propyl-3-methacrylate), polydimethylsiloxane-bis-(1-propyl-3-acrylate) and polydimethylsiloxane-bis-(1-propyl-3-methacrylate).

Further, as the organic ammonium group in the present invention, there are given, for example, an alkyl ammonium group and an alkyl ammonium group having a substituent. An organic ammonium salt refers to salt having these organic ammonium groups.

As a method of producing the above copolymer (B), there can be used various polymerization methods such as solution polymerization, static polymerization, precipitation polymerization, reversed phase suspension polymerization, reversed phase emulsion polymerization and bulk polymerization. These methods can be performed in any form of a batch type or a continuous type. For example, the polymerization of above copolymer (B) is preferably conducted using a solvent, a polymerization initiator and a chain transfer agent and the like. Temperature of polymerization is appropriately determined depending on a method of polymerization, a solvent, a polymerization initiator, a chain transfer agent, etc. to be used, but usually polymerization is conducted at 0 to 150° C.

As the above-mentioned solvent, water; alcohols such as methyl alcohol, ethyl alcohol, isopropyl alcohol and the like; aromatic or aliphatic hydrocarbons such as benzene, toluene, xylene, cyclohexane, n-heptane and the like; esters such as ethyl acetate and the like; and ketones such as acetone, methyl ethyl ketone and the like are suitably used.

As the above-mentioned polymerization initiator, persulfates such as ammonium persulfate, sodium persulfate, potassium persul fate; hydrogen peroxide; azo compounds such as azobis-2-methylpropionamidine hydrochloride, azoisobutyronitrile; peroxides such as benzoyl peroxide, lauroylperoxide, cumene hydroperoxide; and the like are suitably used. In using these polymerization initiators, an accelerator may be used. As the accelerator, reducing agents such as sodium hydrogensulfite, sodium sulfite, mol salt, sodium pyrohydrogensulfite, sodium formaldehyde sulphoxylate and ascorbic acid; and amine compounds such as ethylenediamine, sodium ethylenediaminetetraacetate and glycine are suitably used.

As the above-mentioned chain transfer agent, mercaptopropionic acid, mercaptopropionic acid 2-ethylhexyl ester, octanoic acid 2-mercaptoethyl ester, 1,8-dimercapto-3,6-dioxaoctane, decanetrithiol, dodecyl mercaptan, hexadecanethiol, decanethiol, carbon tetrachloride, carbon tetrabromide, α-methylstyrene dimer, terpinolene, α-terpinene, γ-terpinene, dipentene, 2-aminopropane-1-ol and the like are suitably used.

The above-mentioned solvent, polymerization initiator, accelerator and chain transfer agent, respectively, may be used singly or in combination of two or more species.

The copolymer (B) obtained in the above-mentioned production of copolymer (B) may be added to the hydraulic composition as it is, but it may be added after neutralization by an alkaline substance if necessary. As such an alkaline substance, inorganic salts such as hydroxides, chlorides and carbonates of a monovalent metal and a divalent metal, ammonia, organic ammonium compounds and the like are preferred.

As the high-performance water reducing agent (C) of the present invention, naphthalene based water reducing agents such as naphthalenesulfonic acid salt and salt of condensation of naphthalenesulfonic acid-formaldehyde, lignosulfonic acid salt based water reducing agents and polycarboxylic acid based water reducing agents and the like can be used, but polycarboxylic acid based water reducing agents are preferred. As a polycarboxylic acid base high-performance water reducing agent, at least one species selected from the group consisting of the following copolymers (C1), (C2) and (C3) and a graft polymer obtained by conducting graft polymerization of (poly)alkylene glycol with an unsaturated carboxylic acid base monomer are suitable and another polycarboxylic acid base high-performance water reducing agents can be used.

The copolymer (C1) is a copolymer having a repeating unit (V) represented by the following formula (4);

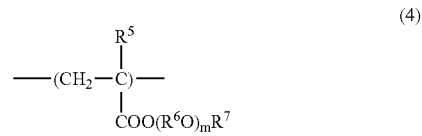

(wherein $R^5$ represents a hydrogen atom or a methyl group. $R^6O$ represents an oxyalkylene group having 2 to 18 carbon atoms. $R^7$ represents an alkyl group, an alkenyl group, an alkyl phenyl group or a phenyl group, having 1 to 22 carbon atom(s). m is an average number of moles of addition of an oxyalkylene group and represents an integer of 1 to 300), and a repeating unit (VI) expressed by the following formula (5);

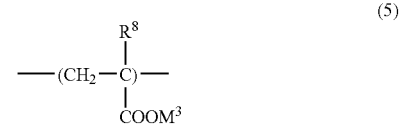

(wherein $R^8$ represents a hydrogen atom or a methyl group. $M^3$ represents a hydrogen atom, a monovalent metal, a divalent metal, an ammonium group or an organic ammonium group).

The copolymer (C2) is a copolymer having a repeating unit (VII) represented by the following formula (6);

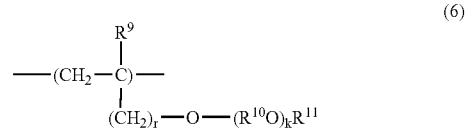

(wherein $R^9$ represents a hydrogen atom or a methyl group. $R^{10}O$ represents an oxyalkylene group having 2 to 18 carbon atoms. $R^{11}$ represents an alkyl group, an alkenyl group, an alkyl phenyl group or a phenyl group having 1 to 22 carbon atom(s). k is an average number of moles of addition of an oxyalkylene group and represents an integer of 1 to 300. r is an integer of 0 to 2), and a repeating unit (VIII) represented by the following formula (7);

(7)

(wherein X represents —$OM^5$, $COOM^4$ and COX may form a structure of an anhydride. $M^4$ and $M^5$ are same or different and each represents a hydrogen atom, a monovalent metal, a divalent metal, an ammonium group or an organic ammonium group).

The copolymer (C3) is a copolymer having a repeating unit (IX) represented by the following formula (8);

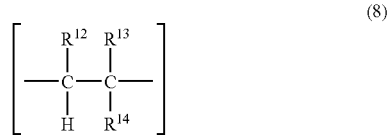
(8)

(wherein $R^{12}$ and $R^{13}$ are same or different and each represents a hydrogen atom or a hydrocarbon group having 1 to 30 carbon atom(s), parts of carbon chains of $R^{12}$ and $R^{13}$ may be combined. $R^{14}$ represents an organic group selected from the group consisting of a hydrogen atom, a phenyl group, an alkyl phenyl group, a sulfonated phenyl group, an alkyl group having 1 to 30 carbon atom(s), an alkenyl group having 1 to 30 carbon atom(s), an alkoxyl group having 1 to 30 carbon atom(s) and —$OCOR^{15}$. $R^{15}$ represents an alkyl group, an alkenyl group, a phenyl group or an alkyl phenyl group having 1 to 30 carbon atom(s)), and a repeating unit (X) represented by the following formula (9);

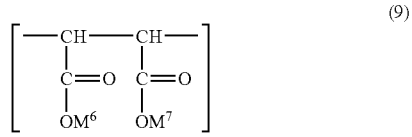
(9)

(wherein $M^6$ and $M^7$ are same or different and each represents a hydrogen atom, a monovalent metal, a divalent metal or an organic ammonium group), and a repeating unit (XI) represented by the following formula (10);

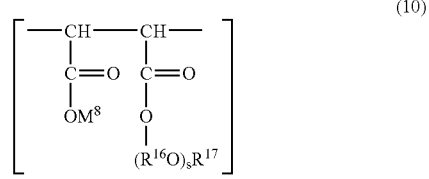
(10)

(wherein $M^8$ represents a hydrogen atom, a monovalent metal, a divalent metal or an organic ammonium group. $R^{16}$ represents an alkylene group having 2 to 18 carbon atoms. $R^{17}$ represents an alkyl group, an alkenyl group, a phenyl group or an alkyl phenyl group having 1 to 30 carbon atom(s). s is an average number of moles of addition of an oxyalkylene group and represents an integer of 1 to 300).

Weight average molecular weights of the above-mentioned copolymers (C1) to (C3) are preferably 5,000 to 500,000. More preferably, they are 10,000 to 150,000, and furthermore preferably, they are 15,000 to 100,000. When the weight average molecular weights are out of the range of 5,000 to 500,000, sufficient water reducing performance may not be attained.

In the above-mentioned polycarboxylic acid base water reducing agent, a copolymer of alkoxy(poly)alkylene glycol (meth)acrylic acid ester and (meth)acrylic acid is suitably used as the copolymers (C1). As the copolymers (C2), a copolymer of a compound formed by adding 1 to 300 moles of alkylene oxide to unsaturated alcohol such as allyl alcohol, methallyl alcohol and 3-methyl-3-butene-1-ol and maleic acid is suitable. And, as the copolymers (C3), a copolymer formed by esterifying a copolymer of alkyl vinyl ether and maleic anhydride with alkoxypolyalkylene glycol, a copolymer formed by esterifying a copolymer of styrene and maleic anhydride with alkoxypolyalkylene glycol, a copolymer formed by esterifying a copolymer of α-olefin and maleic anhydride with alkoxypolyalkylene glycol, and a copolymer formed by esterifying a copolymer of vinyl acetate, maleic anhydride with alkoxypolyalkylene glycol and others are suitable.

In a method of producing the hydraulic composition of the present invention, it is preferred that the copolymer (B) and the high-performance water reducing agent (C) are previously mixed and the resulting mixture is added. It is more preferred that the copolymer (B) and the high-performance water reducing agent (C) are previously dissolved into a single solution and the resulting solution is added. By previously mixing them and adding, the effect of the present invention will be more exerted. The mixing ratio of the copolymer (B) to the high-performance water reducing agent (C) ((B)/(C)) is preferably 30/70 (mass ratio) or smaller. It is more preferably 15/85 or smaller, and still more preferably 5/95 or smaller.

The powdery cement admixture (D) in the present invention is used for reducing a unit amount of cement in concrete or improving a variety of properties, and when the powdery cement admixture (D), which is inorganic powder other than cement, is contained previously in the cement (A), the total mass of the powdery cement admixture (D) further added to the cement (A) which already contains powdery cement admixture is not less than 5% by mass based on 100% by mass of cement (A). As the powdery cement admixture (D), at least one species selected from the following substances is preferred. The following substances may be used singly or in combination of two or more species.

(1) Inorganic powder which has a hydraulic property or a potential hydraulic property when being mixed in cement;
  blast-furnace slag
  silica fume
  natural pozzolana
  expansive additive: ettringite based one; a substance producing expandable ettringite by reaction with water.
  Lime based one; a substance utilizing an expanding property of calcium oxide in hydration.

(2) Inorganic powder which does not have a hydraulic property or a potential hydraulic property;
  crushed stone powder
  limestone fine powder Among them, uses of blast-furnace slag, fly ash and limestone fine powder are preferred. And, it is preferred to use a substance having a relative surface area of 3,000 to 6,000 cm$^2$/g.

Incidentally, in the present invention, the powdery cement admixture (D) and the cement (A) may be previously mixed, and the use of blended cement is included in this case. Even in this case, it is preferred to add further the powdery cement admixture (D) separately in order to exert the effect of the present invention more sufficiently.

As the cement (A) in the present invention, Portland cement (normal, early strength, ultra early strength, moderate heat, sulfate resistance and low-alkali type thereof), white portland cement, high alumina cement, rapid setting cement, grout cement, oil well cement and the like are suitable. As a form in which the cement (A) and the powdery cement admixture (D) are previously mixed, blended cement such as Portland blast-furnace slag cement, fly ash cement and silica cement may be used.

In the hydraulic composition of the present invention, it is preferred that hydraulic composition comprises the copolymer (B) in an amount of 0.0001 to 0.5% by mass, the high-performance water reducing agent (C) in an amount of 0.01 to 5% by mass and the powdery cement admixture (D) in an amount of 5 to 200% by mass based on 100% by mass of the cement (A). That is, preferably, the amount of the copolymer (B) to be added to 100% by mass of the cement (A) is not less than 0.0001% by mass and not more than 0.5% by mass, the amount of the high-performance water reducing agent (C) is not less than 0.01% by mass and not more than 5% by mass, the amount of the powdery cement admixture (D) is not less than 5% by mass and not more than 200% by mass. More preferably, the amount of the copolymer (B) to be added to 100% by mass of the cement (A) is not less than 0.001% by mass and not more than 0.1% by mass, the amount of the high-performance water reducing agent (C) is not less than 0.05% by mass and not more than 1% by mass, the amount of the powdery cement admixture (D) is not less than 10% by mass and not more than 150% by mass.

In the above-mentioned preparation of the hydraulic composition, the copolymer (B), the high-performance water reducing agent (C) and the powdery cement admixture (D) may be added to the cement (A) in powder form or may be dissolved in water and added to the cement (A) in a form of an aqueous solution.

An amount of cement used per 1 m$^3$ of the hydraulic composition of the present invention, a unit water rate, is preferably 120 to 185 kg/m$^3$. More preferably, it is 130 to 175 kg/m$^3$. And a mass ratio of water to cement is preferably 0.2 to 0.7. More preferably, it is 0.3 to 0.6. And, the hydraulic composition is blended with aggregate such as sand or gravel as required. By mixing aggregate, it is possible to enhance the working efficiency in the construction field of civil works and architecture and the like and also the strength of the hydraulic composition after setting.

other cement additives may be added to the hydraulic composition of the present invention. As other cement additives, there are given water-soluble polymer material such as poly(meth)acrylic acid (or sodium poly(meth)acrylate), polymer emulsion formed from alkyl (meth)acrylate and the like, a retarder, an accelerator, an early strength agent, a defoaming agent, a water-proofer, a corrosion inhibitor, an expansive additive, a shrinkage reducing agent, a wetting agent, a thickener, a flocculant, a self-leveling agent, a coloring agent and an anti-fungus agent. They may be used singly or in combination of two or more species.

In the hydraulic composition of the present invention, needle penetration resistance is preferably measured at 9 hours after water injection in preparing the hydraulic composition according to ASTM C 403/C 403M, and the fluidity is preferably measured according to slump test method of JIS A 1173. And, with respect to the measurement of a separated water amount, it is preferred that 500 ml of the prepared hydraulic composition is charged to a 500 ml glass graduated cylinder and left standing and measure an amount of water, which was separated on the hydraulic composition at 1 hour after water injection in preparing the hydraulic composition. In the hydraulic composition of the present invention, a separated water amount is preferably not more than 5 ml or less and more preferably not more than 3 ml.

The hydraulic composition of the present invention is composed as described above, it enables both of high fluidity and material separation reducing and can eliminate the delay of setting, and it allows the work on cement compositions such as cement paste, mortar and concrete to be easy and can improve the working efficiency in the field of civil works and architecture and the like.

BEST MODE FOR CARRYING OUT THE INVENTION

The present invention will be explained in more detail by way of Examples, but the present invention is not limited to these Examples. Unless otherwise indicated, "part" means "part by weight", "wt %" means "% by mass".

Apparatuses and measurement methods used for analysis and measurement are shown below.

[Measurements of Weight Average Molecular Weights of VP-SA, VP-SA-AMPS]
Model of apparatus: Millennium System manufactured by Waters Corp.
Detector: 410 RI detector manufactured by Waters Corp.
Test Column: OHpak SB-806 manufactured by Shodex
Eluate: water 992.3 g
boric acid 3.1 g
potassium chloride 3.73 g
sodium hydroxide 0.83 g
flow rate: 1.0 ml/min.
measurement temperature: 40° C.
reference sample: polyethylene glycol
molecular weight 860000, 570000, 270000, 160000, 85000, 45000, 21000

[Materials]
Cement: ordinary portland cement
Fly ash: fly ash by CHUBU Electric Power Co.,Inc.
Sand: sand from Oppama
High-performance water reducing agent: polycarboxylic acid base high-performance water reducing agent AQUALOC FC-900 (produced by NIPPON SHOKUBAI CO., LTD.)
Glucan: CARDRUN (produced by Takeda Chemical Industries, Ltd.)

[Preparation of Mortar]
Mortar was prepared by mechanically mixing with a mortar mixer using the above-mentioned materials in the formulations shown in Table 1

[Method of Measuring a Flow Value]
Mortar was flown according to slump test method of JIS A 1173. A largest diameter of mortar spread circularly and a diameter perpendicular thereto were measured and an average of them was taken as a flow value.

[Method of Measuring Separated Water]

500 ml of mortar was charged to a 500 ml glass graduated cylinder and left standing. An amount of water, which was separated on the mortar at 1 hour after water injection in preparing mortar, was measured and this amount was taken as a separated water amount.

[Method of Measuring Needle Penetration Resistance]

Each needle penetration resistance at 9 hours after water injection in preparing mortar was measured according to ASTM C 403/C 403M and compared with another.

[Preparation of VP-SA]

11.7 g of N-vinylpyrrolidone, 8.9 g of a 37% by mass aqueous solution of sodium acrylate and 28.0 g of water were charged into a separable flask and the mixture was dissolved. Dissolved oxygen in the solution was removed by bubbling a nitrogen gas and 1.4 g of a 5% aqueous solution of VA044 (azo initiator produced by Wako Pure Chemical Industries, Ltd.) was added to the solution under nitrogen atmosphere while maintaining the solution at a temperature of 30° C. After the mixture was mixed well under stirring, stirring was stopped and the solution was left standing for a day and a night in a water bath of 30° C. to obtain a copolymer in gel form (VP-SA).

[Preparation of VP-SA-AMPS]

11.7 g of N-vinylpyrrolidone, 4.5 g of a 37% by mass aqueous solution of sodium acrylate, 3.3 g of 2-acrylamido-2-methyl propane sodium sulfonate and 28.0 g of water were charged into a separable flask and the mixture was dissolved. Dissolved oxygen in the solution was removed by bubbling a nitrogen gas and 1.4 g of a 5% aqueous solution of VA044 (azo initiator produced by Wako Pure Chemical Industries, Ltd.) was added to the solution under nitrogen atmosphere while maintaining the solution at a temperature of 30° C. After the mixture was mixed well under stirring, stirring was stopped and the solution was left standing for a day and a night in a water bath of 30° C. to obtain a copolymer in gel form (VP-SA-AMPS).

EXAMPLES 1 TO 2 AND COMPARATIVE EXAMPLES 1 TO 3

With respect to hydraulic compositions prepared based on the formulations shown in Table 1, flow value, separated water amount, and needle penetration resistance were measured. The results are shown in Table 1.

TABLE 1

|  | Comparative Example 1 | Example 1 | Example 2 | Comparative Example 2 | Comparative Example 3 |
|---|---|---|---|---|---|
| Cement (part by weight) | 23 | 23 | 23 | 23 | 27 |
| Fly ash (part by weight) | 4 | 4 | 4 | 4 | — |
| Sand (part by weight) | 60 | 60 | 60 | 60 | 60 |
| Water (part by weight) | 12 | 12 | 12 | 12 | 12 |
| High-performance water reducing agent (wt %-Cement) | 0.25 | 0.25 | 0.25 | 0.25 | 0.25 |
| VP-SA (wt %-Cement) | — | 0.005 | — | — | 0.01 |
| VP-SA-AMPS (wt %-Cement) | — | — | 0.005 | — | — |
| Glucan (wt %-Cement) | — | — | — | 0.005 | — |
| Flow value (mm) | 412 | 383 | 400 | 400 | 380 |
| Separated water amount (ml) | 60 | 0 | 3 | 60 | 5 |

TABLE 1-continued

|  | Comparative Example 1 | Example 1 | Example 2 | Comparative Example 2 | Comparative Example 3 |
|---|---|---|---|---|---|
| Needle penetration resistance (N/mm²) | 7.4 | 7.3 | 7.3 | — | 0.13 |

From Table 1, it is shown that in Example 1 and 2, separation of water was suppressed while keeping high flow values, and needle penetration resistance at 9 hours later from water injection in preparing mortar was almost the same as Comparative Example 1 which used no segregation reducing agent and delay of setting did not occur. In Comparative Example 2, when glucan, which is one of typical material segregation reducing agents other than VP-SA or VP-SA-AMPS, was used in the same addition amount as that of VP-SA or VP-SA-AMPS, there were few effects of suppressing separated water, and therefore, it was found that VP-SA and VP-SA-AMPS in Examples had effects in a small addition amount. And, in Comparative Example 3, when fly ash was not used, needle penetration resistance was low and delay of setting occurred.

In the present invention, the hydraulic composition plays advantageous effects of enabling both of high fluidity and material separation reducing and being able to eliminate the delay of setting by comprising the cement (A), the copolymer (B), the high-performance water reducing agent (C) and the powdery cement admixture (D).

The present application claims priority under 35 U.S.C. §119 to Japanese Patent Application No. 2003-310620, filed Sep. 2, 2003, entitled "HYDRAULIC COMPOSITION". The contents of that application are incorporated herein by reference in its entirety.

The invention claimed is:

1. A hydraulic composition comprising cement (A), a copolymer (B), a high-performance water reducing agent (C) which is a polycarboxylic acid based high-performance water reducing agent, and a powdery admixture for cement (D) being at least one species selected from the group consisting of blast-furnace slag, fly ash and limestone, wherein the copolymer (B) comprises a repeating unit (I) represented by the following formula (1);

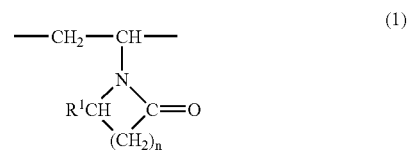

wherein $R^1$ represents a hydrogen atom or a methyl group. n is an integer of 2 to 4, and a repeating unit (II) represented by the following general formula (2);

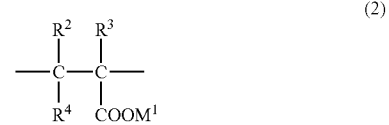

wherein $R^2$, $R^3$ and $R^4$ are same or different and each represents a hydrogen atom, a methyl group or a $(CH_2)_p COOM^2$ group, and may form a structure of an anhydride when the total number of $COOM^1$ groups and $COOM^2$ groups are 2. $M^1$ and $M^2$ are same or different and each represents a hydrogen atom, a monovalent metal, a divalent metal, an ammonium group or an organic ammonium group, and p is an integer of 0 to 2 and wherein said copolymer (B) has a weight average molecular weight of 600,000 to 10,000,000.

2. A method of producing the hydraulic composition according to claim 1, wherein said copolymer (B) and said high-performance water reducing agent (C) are previously mixed and the resulting mixture is added.

3. The hydraulic composition according to claim 1, wherein said hydraulic composition comprises the powdery admixture for cement (D) in an amount of not less than 5% by mass based on 100% by mass of cement (A).

4. The hydraulic composition according to claim 3, wherein said hydraulic composition comprises the copolymer (B) in an amount of 0.000 1 to 0.5% by mass, the high-performance water reducing agent (C) in an amount of 0.01 to 5% by mass and the powdery admixture for cement (D) in an amount of 5to 200% by mass based on 100% by mass of cement (A).

5. The method of the producing the hydraulic composition according to claim 2, wherein said hydraulic composition comprises the powdery admixture for cement (D) in an amount of not less than 5% by mass based on 100% by mass of cement (A).

6. The method of the producing the hydraulic composition according to claim 5, wherein said hydraulic composition comprises the copolymer (B) in an amount of 0.0001 to 0.5% by mass, the high-performance water reducing agent (C) in an amount of 0.01 to 5% by mass and the powdery admixture for cement (D) in an amount of 5 to 200% by mass based on 100% by mass of cement (A).

* * * * *